United States Patent [19]
Lalla et al.

[11] Patent Number: 6,087,978
[45] Date of Patent: Jul. 11, 2000

[54] LEVEL MEASURING DEVICE OPERATING WITH MICROWAVE

[75] Inventors: Robert Lalla, Lörrach; Roland Müller; Bernd Strütt, both of Steinen, all of Germany

[73] Assignee: Endress + Hauser GmbH + Co., Maulburg, Germany

[21] Appl. No.: 09/295,928

[22] Filed: Apr. 21, 1999

[30] Foreign Application Priority Data

May 5, 1998 [EP] European Pat. Off. .............. 98108121

[51] Int. Cl.⁷ ..................................................... G01S 13/08

[52] U.S. Cl. ......................... 342/124; 342/118; 342/134; 342/135; 342/195

[58] Field of Search ........................... 342/118, 120–124, 342/127, 134, 135, 175, 189, 194, 195

[56] References Cited

U.S. PATENT DOCUMENTS

| | | |
|---|---|---|
| 4,521,778 | 6/1985 | Knepper . |
| 5,115,242 | 5/1992 | Nagamune et al. ..................... 342/124 |
| 5,148,177 | 9/1992 | Nagamune et al. ..................... 342/124 |
| 5,182,565 | 1/1993 | Nagamune et al. ..................... 342/124 |

FOREIGN PATENT DOCUMENTS 3107 444  10/1982  Germany .

OTHER PUBLICATIONS

Lang, Hugo and Lubcke, Wolfgang, Smart Transmitter Using Microwave Pulses to Measure the Level of Liquids and Solids in Process Application, 8131 Advances in Instrumentation and Control, ISA, 1993, Paper #93–319, pp. 731–742.

Primary Examiner—Bernarr E. Gregory
Attorney, Agent, or Firm—Bose McKinney & Evans LLP

[57] ABSTRACT

A level measuring device suitable for highly accurate measurements. A transmission pulse generator generates microwave pulses at a transmission repetition rate and transmits them through an antenna towards a material whose level is to be measured. Echo signal from the surface of the material are received by the antenna. A reference pulse generator generates reference pulses similar to the transmission pulses but at a reference repetition rate which differs from the transmission repetition rate by a small frequency difference. The echo signal and reference pulse are input to a first mixer which generates an intermediate frequency signal that, with respect to the echo signal, is slowed by a time dilation factor equal to the quotient of the transmission repetition rate and the frequency difference. A first subcircuit samples the intermediate frequency signal, the time interval between two successive samplings equaling a time unit. A differential signal generator generates a differential signal which changes with the frequency difference. A second subcircuit determines the period of the differential signal on the basis of the time unit. An evaluation unit determines an actual time interval between two points of the echo signal corresponding to the two sampling points.

8 Claims, 4 Drawing Sheets

LEVEL MEASURING DEVICE OPERATING WITH MICROWAVE

BACKGROUND OF THE INVENTION

The invention relates to level measuring devices operating with microwaves. Such measuring devices that operate without physical contact are used in numerous branches of industry. In many industrial applications, for example in the oil industry, highly accurate measurement, for example 1 mm, is required.

For measuring the level microwaves are transmitted by means of an antenna to a surface of a filling material substance and an echo signal reflected at the surface is received. An echo function representing the echo amplitudes as a function of the distance is formed and is used to determine the probably useful echo and its transit time. The transit time is used to determine the distance between the surface of the filling material and the antenna.

One method of measuring distances by means of reflected microwaves is pulsed radar. In the case of pulsed radar, short microwave pulses are transmitted periodically, reflected by the surface of the filling material and received again after a distance-dependent transit time. The received signal amplitude as a function of the time represents the echo function. Each value of this echo function corresponds to the amplitude of an echo reflected at a particular distance from the antenna.

A level measuring device is described in U.S. Pat. No. 4,521,778 (counterpart to DE-A 31 07 444) that operates with microwaves and which comprises:

a transmission pulse generator for generating microwave pulses at a transmission repetition rate $f_s$ which are transmitted during operation in the direction of a filling level to be measured by means of an antenna are reflected at a surface of the filling material and the echo signal of which is received, a reference pulse generator for generating microwave pulses which are identical to the microwave pulses generated by the transmission pulse generator but have a reference repetition rate $f_r$ differing from the transmission repetition rate $f_s$ by a small frequency difference, a first mixer, to the first input of which is applied an output signal of the reference pulse generator, to the second input of which is applied the echo signal and at the output of which an intermediate frequency signal appears that, with respect to the echo signal, is slowed down by a time dilation factor equal to a quotient of the transmission repetition rate and the frequency difference.

The intermediate frequency signal has the same characteristics as the echo signal, but is extended with respect to the echo signal by the time dilation factor. At a transmission repetition rate of several megahertz, a frequency difference of, for example, 10 Hz to 100 Hz and a microwave frequency of several gigahertz, the frequency of the intermediate frequency signal is below 100 kHz.

This allows the use of very much slower and cost-saving components for signal pickup and/or signal evaluation.

The intermediate frequency signal is usually demodulated and sampled and an envelope curve is created from the sampled values and stored in a memory, where it is available for further processing. The envelope curve typically has a maximum that depends of the reflection of the microwave pulse at the surface of the filling material. The time interval between a reference instant and the maximum of the intermediate frequency signal and the time dilation factor can be used to determine the actual transit time of the microwave pulse to the surface of the filling material and back. This actual transit time is a measure of the distance between the surface of the filling material and the filling level measuring device.

The following relationship exists for the time difference $\Delta T$ between two points of the intermediate frequency signal and the actual time difference $\Delta t$ between the associated points of the echo signal:

$$\Delta T = (f_s/\Delta f)\Delta t. \qquad (1)$$

where:

$\Delta T$ is the time difference between two points of the intermediate frequency signal, $\Delta t$ is the actual time difference between the associated points of the echo signal, $f_s$ is the transmission repetition rate and $\Delta f$ is the differential frequency $(f_s-f_r)$ of transmission repetition rate $f_s$ and reference repetition rate $f_r$ and $f_s/\Delta f$ is equal to the time dilation factor.

The accuracy of the filling level measurement consequently depends on how exactly the variables $\Delta T$, $f_s$ and $\Delta f$ are known.

SUMMARY OF THE INVENTION

It is an object of the invention to specify, on the basis of the aforementioned prior art, a filling level measuring device operating with microwaves which is suitable for highly accurate measurements.

This is achieved according to the invention by a filling level measuring device operating with microwaves which comprises:

a transmission pulse generator for generating microwave pulses at a transmission repetition rate which are transmitted during operation by means of an antenna in the direction of a filling level to be measured, are reflected at a surface of the filling material and the echo signal of which is received, a reference pulse generator for generating microwave pulses which are identical to the microwave pulses generated by the transmission pulse generator but have a reference repetition rate different from the transmission repetition rate by a small frequency difference, a first mixer, to the first input of which is applied the echo signal, to the second input of which is applied an output signal of the reference pulse generator, and at the output of which appears an intermediate frequency signal that, with respect to the echo signal, is slowed down by a time dilation factor which is equal to a quotient of the transmission repetition rate and the frequency difference, a first subcircuit for sampling the intermediate frequency signal, in which the time interval between two successive samplings is equal to a time unit, and means for generating a differential signal which changes with the differential frequency, a second subcircuit for determining its period duration on the basis of the time unit, and an evaluation unit, which determines the time dilation factor in the time unit from the period duration, and which by means of this time dilation factor in the time unit determines from a time interval present in the time unit between two sampling points of the intermediate frequency signal an actual time interval between two points of the echo signal that corresponds to the two sampling points.

An actual transit time to be determined depends entirely on fluctuations or changes in this time unit because the sampling of the differential signal and the sampling of the intermediate frequency signal are based on the same time unit means. Effects such as, for example, temperature-dependent fluctuations of the frequency of a component determining the time unit have no effect on the measuring accuracy.

According to one preferred embodiment of the invention, a single clock-pulse generator is provided, which determines the fixed time unit.

According to a another preferred embodiment, the means for generating the differential signal comprise a second mixer, to the first input of which is applied a signal which changes at the transmission repetition rate and to the second input of which is applied a signal which changes at the reference repetition rate and at the output of which appears the differential signal.

According to a further preferred embodiment, the transmission pulse generator comprises:

an oscillator, the frequency of which is equal to the transmission repetition rate, a pulse generator, which is connected downstream of the oscillator, and which converts an output signal of the oscillator into a control signal, and a microwave source, which is controlled by the control signals, and which transmits the microwave pulses.

According to a further preferred embodiment, the reference pulse generator comprises:

an oscillator, the frequency of which is equal to the reference repetition rate, a pulse generator, which is connected downstream of the oscillator, and which converts an output signal of the oscillator into a control signal, and a microwave source, which is controlled by the control signals, and which transmits the microwave pulses.

According to a further preferred embodiment, the first subcircuit for the sampling of the intermediate frequency signal comprises a sample-and-hold circuit and an analog/digital converter, connected to an output of the sample-and-hold circuit.

According to a preferred development of the invention, the second subcircuit for the sampling of the differential signal comprises:

a comparator, at the output of which appears a signal at a first signal level if the differential signal at the sampling instant exceeds a prescribed threshold value and at the output of which appears a signal at a second signal level if the differential signal at the sampling instant is less than a prescribed threshold value, an edge detector, which is connected to a comparator and detects the beginning of a period of the differential signal, and a counter, which counts the number of elapsing time units during a predefined number of periods of the differential signal.

According to a further preferred development, means are provided which serve for reading out the counter reading after the predefined number of periods of the differential signal have elapsed and use this read out determine the period duration of the differential frequency.

The invention and further advantages are now explained in more detail on the basis of the figures of the drawing, in which an exemplary preferred embodiment is represented; elements that are similar in design and function bear the same reference numerals in the figures.

DETAILED DESCRIPTION OF THE PREFERRED EMBODIMENTS

Figure 1:
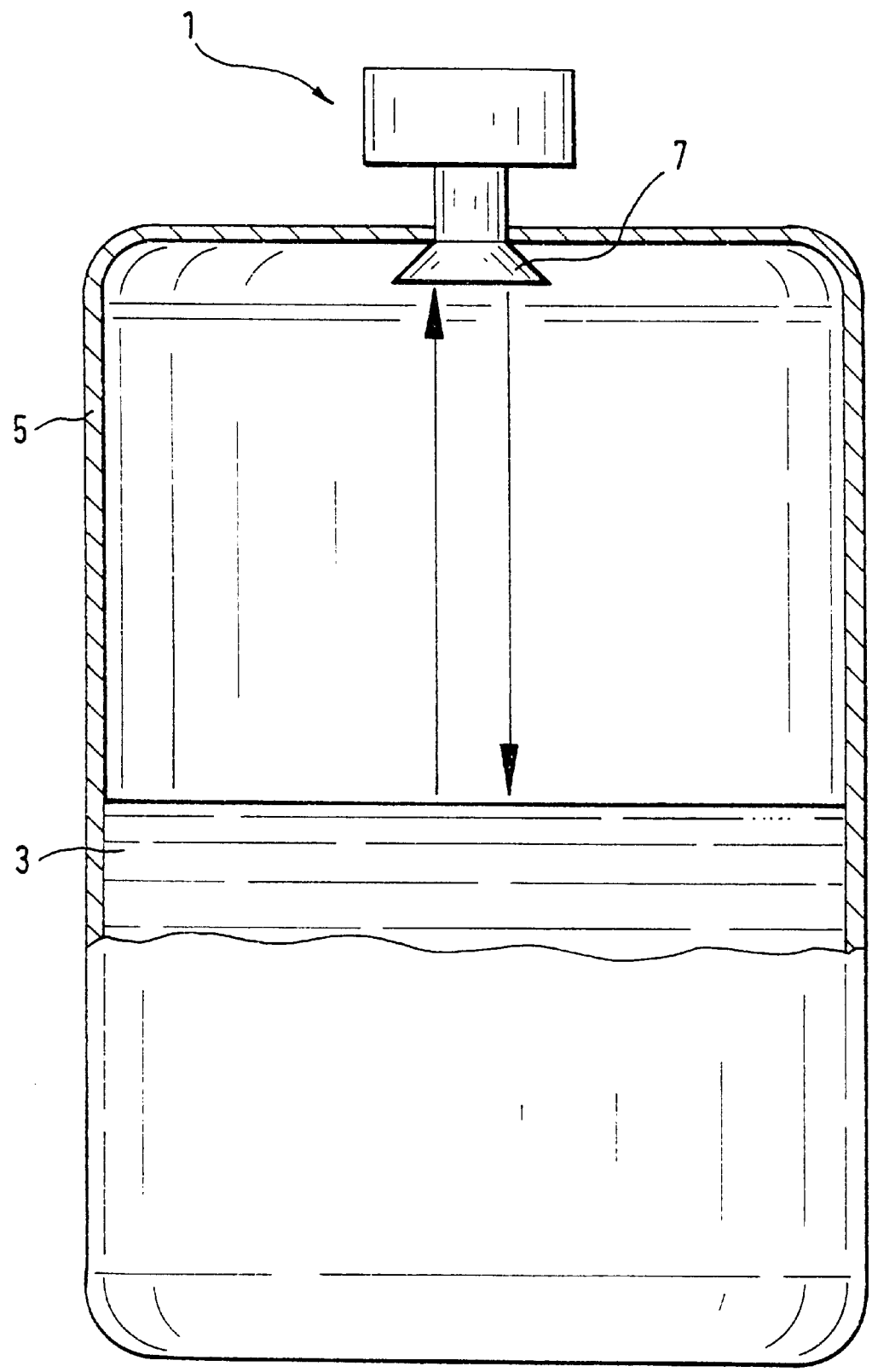
FIG. 1 shows a level measuring device mounted onto a container.

Represented in FIG. 1 is a level measuring device 1 operating with microwaves, which is mounted on a container 5 filled with a filling material 3. The level measuring device 1 has an antenna 7, by means of which, during operation, it transmits microwave pulses in the direction of the filling material of which the filling level is to be measured. The transmitted microwave pulses are reflected at a surface of the filling material and their echo signals are received. The path of the microwave pulses during operation is represented by arrows.

Figure 2:
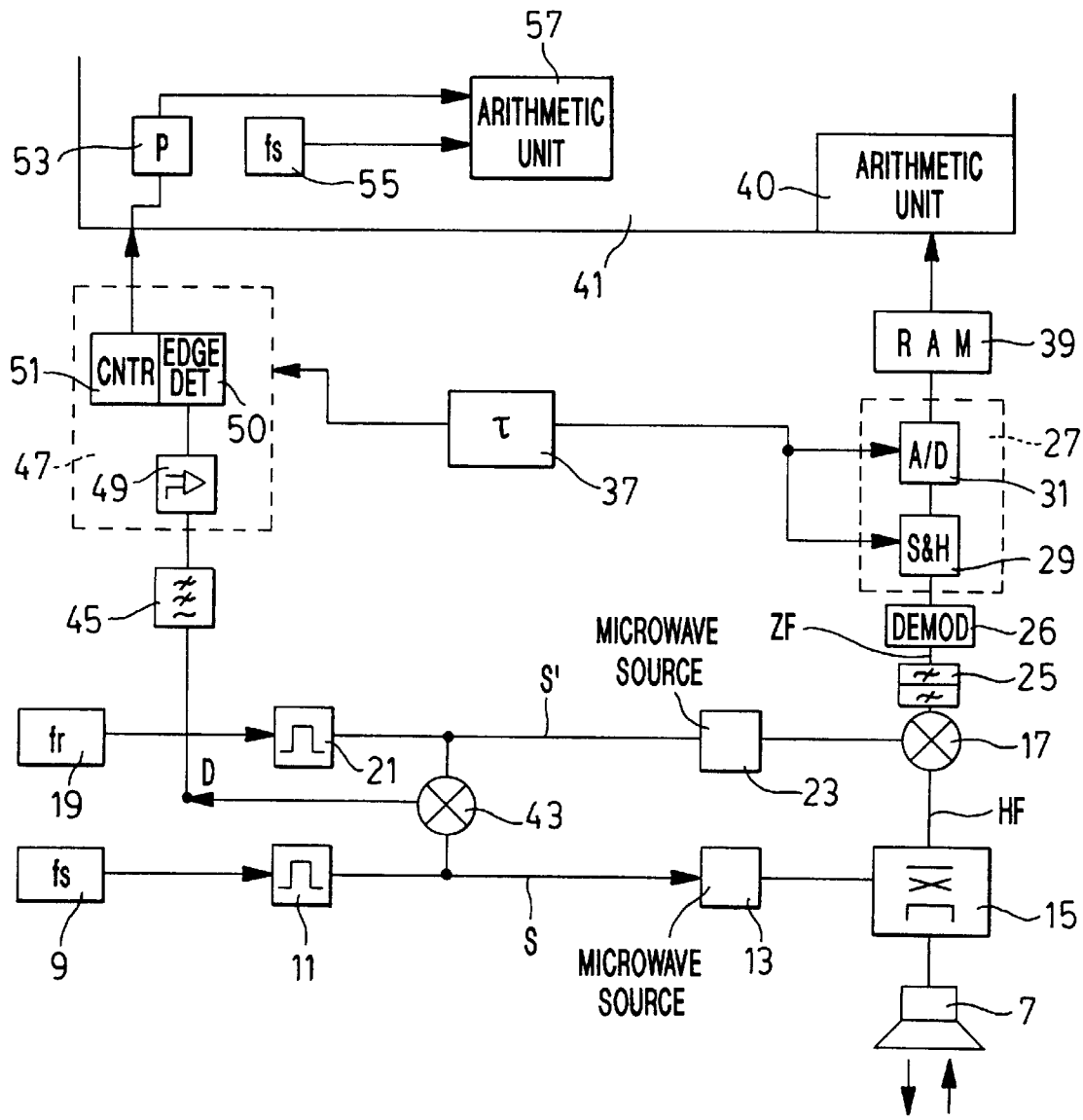
FIG. 2 shows a circuit layout of a filling level measuring device according to the invention.

FIG. 2 shows an exemplary embodiment of a circuit layout of a filling level measuring device according to the invention.

A transmission pulse generator for generating microwave pulses at a transmission repetition rate $f_s$ is provided. Said generator comprises an oscillator 9, the frequency of which is the transmission repetition rate $f_s$. The oscillator 9 is, for example, a quartz oscillator with a high frequency stability. Connected downstream of the oscillator 9 is a pulse generator 11. This converts an output signal of the oscillator 9 into a control signal S. The control signal S has, for example, the form of short square-wave pulses. The control signal S is used to activate a microwave source 13, for example a Gunn diode, which accordingly emits microwave pulses. The control signal S may be supplied, for example, in the form of a trigger signal, by which the microwave source 13 is switched on and off. Alternatively, the microwave source 13 may be permanently switched on and a gate circuit provided, which opens or blocks in dependence on the control signal S. The period duration of the control signal S is equal to the inverse value of the transmission repetition rate $f_s$. In this case the control signal S would in this case be a series of square-wave pulses and the duration of the square-wave pulses is equal to the duration of the microwave pulses and is, for example, one nanosecond. The transmission repetition rate $f_s$ is, for example, several megahertz. The emitted microwave pulses are transmitted via a directional coupler 15 to the antenna 7 and sent into the container 5.

The echo signal is picked up by means of the antenna 7 and is applied via the directional coupler 15 to a first input of a mixer 17. Of course, instead of a single antenna for transmitting and receiving, two antennas, one of which serves for transmitting and one of which serves for receiving, can be used as well.

In addition, a reference pulse generator is provided. This serves for generating microwave pulses which are identical to the microwave pulses generated by the transmission pulse generator but have a reference repetition rate $f_r$, which differs from the transmission repetition rate $f_s$ by a small frequency difference $\Delta f$. The frequency difference is of several hertz, for example, 40 Hz. The reference pulse generator is constructed in a way analogous to the transmission pulse generator. It has an oscillator 19, the frequency of which is equal to the reference repetition rate $f_r$. Connected downstream of the oscillator 19 is a pulse generator 21, which converts an output signal of the oscillator 19 into a control signal S', and a microwave source 23 is provided, which is controlled by the control signal S' and emits the microwave pulses.

The output signal of the reference pulse generator is present at a second input of the mixer 17. At the output of the mixer 17 an intermediate frequency signal ZF appears. In order to allow a correctly timed sampling of the echo signal by the microwave pulses generated by the reference pulse generator, the reference repetition rate $f_r$ is less than the transmission repetition rate $f_s$. The intermediate frequency signal ZF is slowed down with respect to the echo signal by a time dilation factor equal to a quotient of the transmission repetition rate $f_s$ and the frequency difference $\Delta f$.

At a transmission repetition rate of several megahertz, a frequency difference of, for example, 10 Hz to 100 Hz and a microwave frequency of several GHz, the frequency of the intermediate frequency signal is below 100 kHz. Connected downstream of the mixer 15 is a low-pass filter 25, which does not allow the desired frequencies of the intermediate frequency signal ZF to pass. The cutoff frequency of such a filter is typically several hundred kilohertz. The filtered intermediate frequency signal ZF is supplied to a demodulator 26. This may be, for example, a simple rectifier.

The filtered and demodulated intermediate frequency signal ZF is supplied to a first subcircuit 27, which serves for sampling the intermediate frequency signal ZF.

Figure 3:
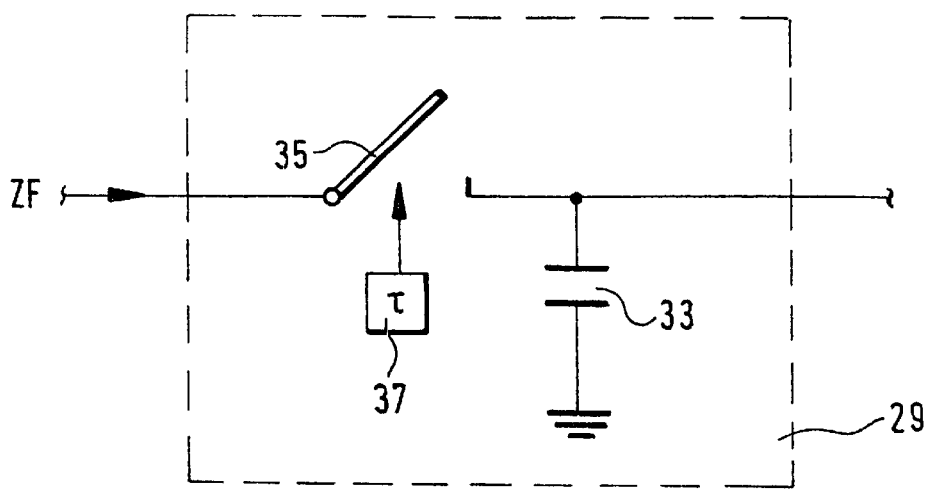
FIG. 3 shows an preferred exemplary embodiment of a sample-and-hold circuit from FIG. 2.

In the case of the exemplary preferred embodiment shown, the sampling takes place by means of a sample-and-hold circuit 29 and an analog/digital converter 31. The simplest form of a sample-and-hold circuit is represented in FIG. 3. It has a capacitor 33 with an upstream switch 35. If the switch 35 is closed, the capacitor 33 is charged in a way corresponding to the applied intermediate frequency signal ZF. The switch 35 is subsequently opened and the voltage applied to the capacitor 33 is converted from analog to digital. The sampled value thus obtained corresponds to the amplitude of the intermediate frequency signal ZF at the instant at which the switch 35 was opened. A clock-pulse generator 37 is provided, which prescribes a time unit $\tau$ with which the timing of the sample-and-hold circuit 29 and the analog/digital converter 31 are controlled. The time interval between two switch openings is a time unit $\tau$. In a corresponding way, the time interval between two successive samplings of the intermediate frequency signal ZF is equal to a time unit $\tau$. The digital sampled values are stored in a memory 39, for example a random access memory.

Figure 4:
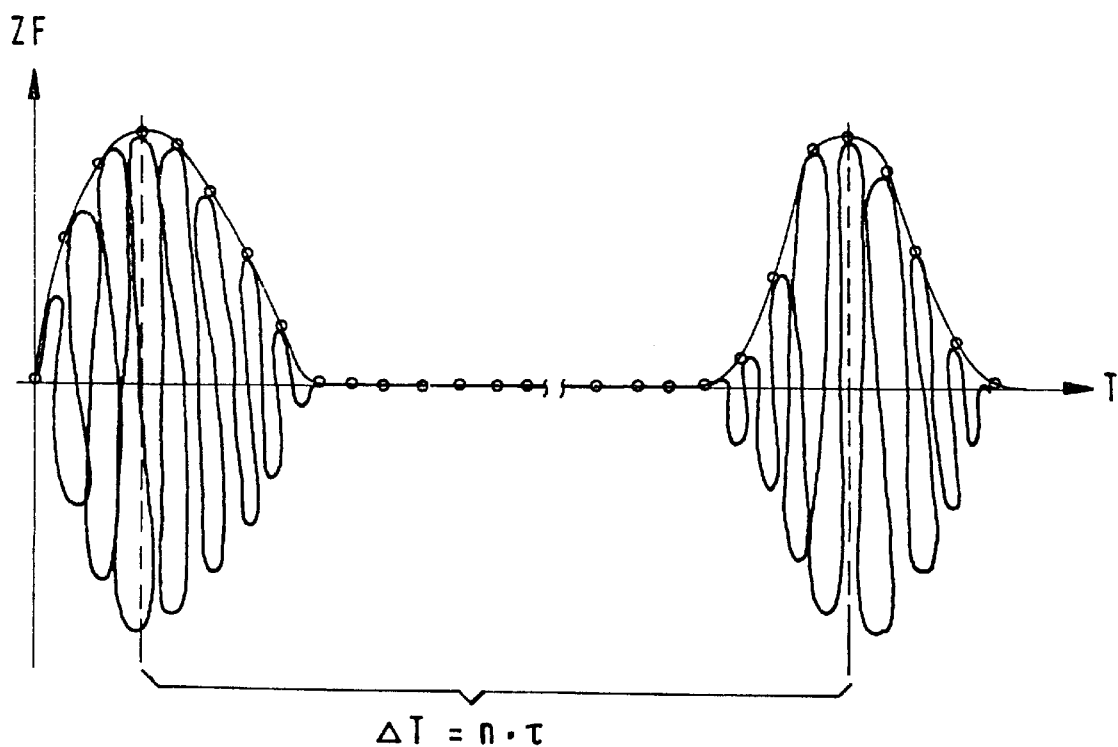
FIG. 4 shows a recording of an example of an intermediate frequency signal ZF.

FIG. 4 shows an example of a thus obtained recording of the intermediate frequency signal ZF. The intermediate frequency signal ZF is plotted as a function of time T; the interval between two sampled values, represented by dots, being one time unit $\tau$. The recording clearly shows two maxima. The first maximum is associated with that part of the transmitted microwave pulse, which directly reaches the mixer 17 via the directional coupler 15. The second maximum is associated with that part of the same transmitted microwave pulse that is reflected at the surface of the filling material.

Of course, the time interval between different significant points of the echo signal or the intermediate frequency signal ZF may also be relevant. The structure and evaluation then differ from that described below only in the means which are provided for detecting the significant points.

An evaluation unit 41 is provided, which determines the position of the two maxima from the stored sampled values and establishes their time interval. This is done, for example, by means of an arithmetic unit 40. The time interval $\Delta T$ between these two maxima is a multiple n of the time unit $\tau$. The time interval $\Delta T$ can be used to determine the actual transit time l of the microwave pulse by means of the time dilation factor.

As already described, the time dilation factor is equal to the quotient of the transmission repetition rate $f_s$ and the frequency difference $\Delta f$, and the accuracy of the measurement depends substantially on this variable.

Means for generating a differential signal D, which changes with the differential frequency $\Delta f$, are provided. These means preferably comprise a second mixer 43, to the first input of which a signal is applied which changes at the transmission repetition rate $f_r$ and to the second input of which a signal is applied which changes at the reference repetition rate $f_s$. The output signal of the mixer 43 contains the differential signal D and signals of significantly higher frequency. It is present at a low-pass filter 45, which filters out the higher-frequency signals and at the output of which the pure differential signal D is available.

Input signals at the mixer 43 may be, for example, the output signals of the two oscillators 9 and 19. However, as shown in the exemplary preferred embodiment of FIG. 2, the output signals of the two pulse generators 11 and 21 may also be used.

A second subcircuit 47 is provided for sampling the differential signal D and for determining its period duration P. In this case, the time interval between two successive samplings of the differential signal D is likewise equal to the time unit $\tau$.

Preferably only one single clock-pulse generator 37 is provided, which defines the fixed time unit $\tau$. Alternatively, however, two or more clock-pulse generators may also be provided, which are derived from a single basic clock-pulse generator and behave identically, i.e. their deviations from a setpoint clock pulse rate, caused for example by fluctuations in the ambient temperature, coincide.

In the exemplary preferred embodiment represented in FIG. 2, the second subcircuit 47 comprises a comparator 49, to which the output signal of the low-pass filter 45 is applied.

At the output of the comparator 49 a signal at a first signal level H appears if the differential signal D at the sampling instant exceeds a predefined threshold value W and a signal at a second signal level L appears if the differential signal D at the sampling instant is less than the predefined threshold value W.

Figure 5:
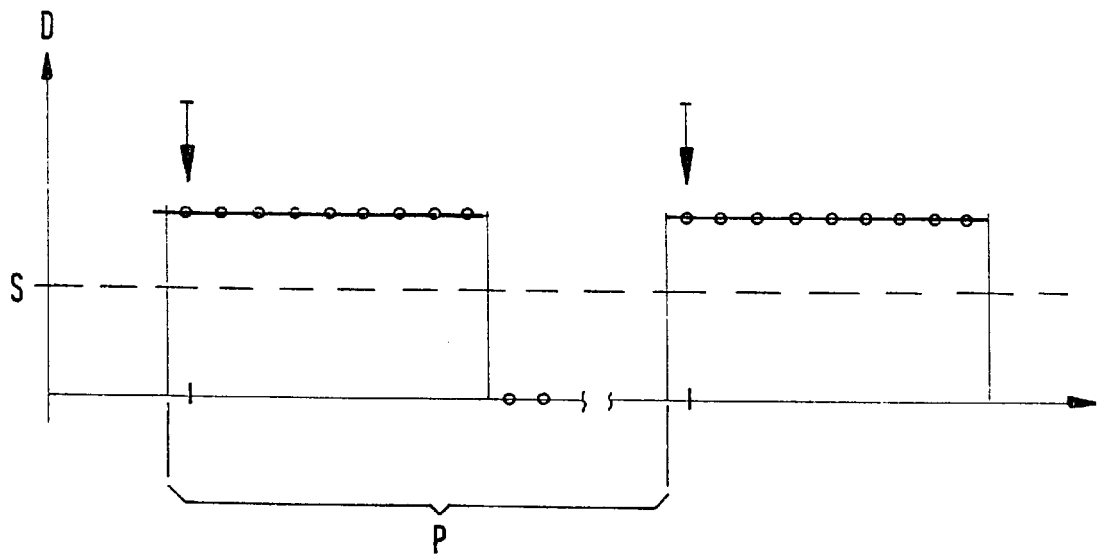
FIG. 5 shows an example of a differential signal D for the case in which the output signals of the pulse generators from FIG. 2 are used for forming the differential signal D.

FIG. 5 shows an example of a differential signal D which is generated as described above if the output signals of the pulse generators are used for forming the differential signal D and the pulse generators supply series of square-wave pulses.

Figure 6:
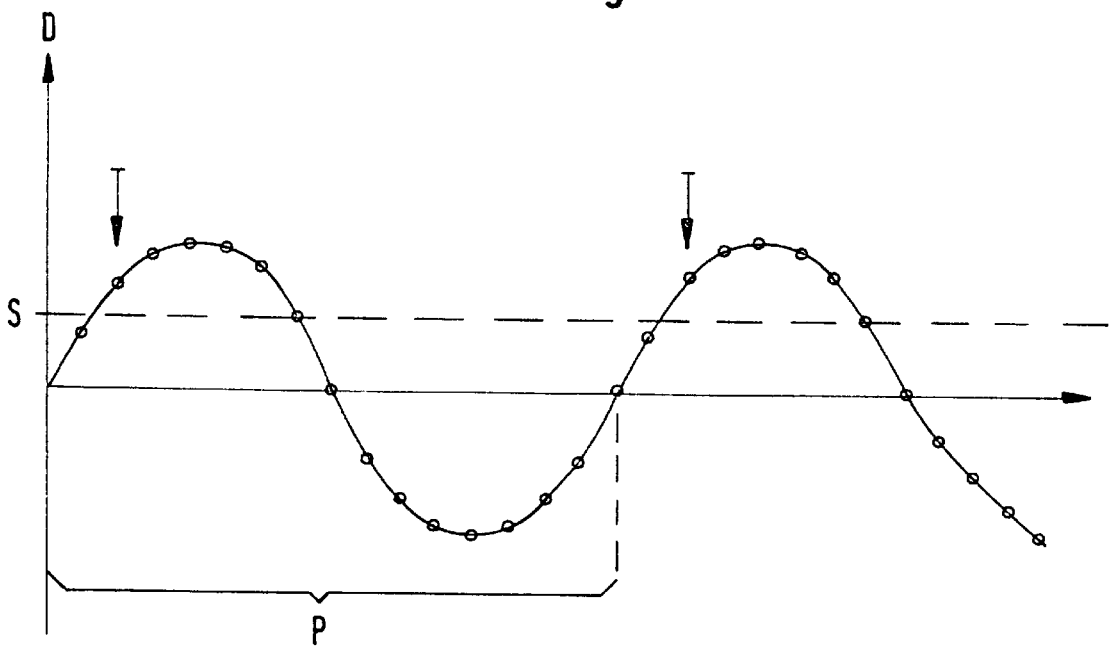
FIG. 6 shows an example of a differential signal D for the case in which the output signals of the oscillators from FIG. 2 are used for forming the differential signal D.

FIG. 6 shows an example of a differential signal D which is generated as described above if the output signals of the oscillators 9, 19 are used for forming the differential signal.

The threshold value W is respectively depicted and the samplings are represented by dots. The threshold value W may be any desired fixed value that is greater than the smallest and less than the largest occurring value of the differential signal D.

Connected to the comparator 49 is an edge detector 50, which detects the beginning of a period P of the differential signal D. This is achieved, for example, by comparing two succeeding signal levels at the output of the comparator 49. For this purpose the output signal of the comparator 49, for example, may be applied to an input of a NAND element respectively, in one case directly and in one case via a delay line, which generates a delay by a time unit τ. Every second time when the NAND condition is satisfied, a new period begins. For example, whenever a first signal level H follows a second signal level L, this may be the beginning of a new period P. This beginning of a period is indicated in FIGS. 5 and 6 by arrows.

A counter 51 is provided, which counts the number m of elapsing time units τ during a prescribed number x of periods of the differential signal D. A first output signal, for example, generated by the edge detector 50 starts the counter 51 at the beginning of a period and a second output signal stops the counter 51, i.e. at the beginning of the x+1 period, after the prescribed number x has elapsed. There may be provided, for example, a microcontroller, not represented in FIG. 2, for reading out the counter reading. This microcontroller may be arranged, for example, in the second subcircuit 47 or in the evaluation unit 41.

The counter reading m is an integral number and indicates the duration of x periods in the time unit τ. The period duration P is correspondingly given by:

$$P=(1/x)m\ \tau$$

The duration of x periods is determined in this way with the accuracy τ. The relative error of the period duration P is:

$$\Delta P/P=\Delta(xP)/(xP)=\tau/(m\tau)$$

Since the time unit τ is preset, the accuracy with which the period duration P is measured is determined by the number x of periods over which the measuring is carried out. The counter reading m is equal to a product of the number x of periods and a number of time units τ per period duration P.

As long as the ambient conditions, such as the temperature for example, which affects the frequency stability of the oscillators 9, 19 only change slowly, it is sufficient to perform the determination of the period duration P at regular time intervals which are small in comparison with the time scale over which the ambient conditions change.

The measured period duration P is applied to the evaluation unit 41. There it is stored, for example in a memory 53, the content of which is updated with every new measurement of the period duration P. A further memory 55, in which the transmission repetition rate $f_s$ is stored, is provided in the evaluation unit 41. This value $f_s$ is entered in the memory at the factory and is not subject to any change after that.

In the evaluation unit 41 there is an arithmetic unit 57, which determines the time dilation factor in the time unit τ from the period duration P. Since the period duration P is equal to the inverse value of the differential frequency Δf, the time dilation factor equals the product of the transmission repetition rate $f_s$ and the period duration P. The period duration P is already obtained in the desired unit τ, thus the following is achieved for the time dilation factor:

$$f_s/\Delta f = f_s P = f_s(1/x)m[\tau]$$

By means of this time dilation factor in the time unit τ, an actual time interval Δt between two points of the echo signal corresponding to the two sampling points is determined in the evaluation unit 41, for example in the arithmetic unit 57, by means of a time interval ΔT that is present in the time unit τ, between two sampling points of the intermediate frequency signal ZF.

This is explained below on the basis of the example of the intermediate frequency signal ZF represented in FIG. 4. Of course, the two sampling points for which the actual time interval is to be determined may also correspond to other significant points of the echo signal, for example the interval between the antenna and an echo generated by a reference reflector.

As described above, the transit time of the microwave pulse corresponds to the time interval ΔT=n τ between the two maxima of the intermediate frequency signal ZF from FIG. 4. This time interval ΔT corresponds to an actual time interval Δt between the two associated points of the echo signal, which interval is equal to the transit time 1 of the corresponding microwave pulse.

The distance H between the bottom of the container and the level measuring device is assumed to be known. From the actual transit time 1 of a microwave pulse from the antenna 7 to the surface of the filling material and back, the filling level h is as follows, taking into account the propagation velocity c of microwaves:

$$h=H-(c1)/2$$

yielding to:

$$\Delta t = n\tau = (f_s/\Delta f)\ \Delta t$$
$$= f_s P\ \Delta T$$
$$= f_s m/x\tau\Delta t$$

For the sought actual time difference between the transmitted pulse and the received pulse it follows that:

$$\Delta T = x(n/m)f_s$$

The result is independent of the time constant τ. An error in the time constant and/or a change therein because of temperature or time do not have any effect on the measuring accuracy. The only error source effecting this equation may be a false transmission repetition rate $f_s$. This fault can be kept very small by the use of a quartz oscillator with great frequency stability. Oscillators with a relative error of $\Delta f/f<10^{-6}$ are available.

Of course, the time constant $\tau$ also affects the accuracy of the sampling to such extent as to which it determines the latter. For a distance s of 1 millimeter, a microwave pulse requires a transit time of $t_s=s/c$, wherein c being the propagation velocity of the microwave pulse, which is approximately equal to the speed of light in a vacuum of $c \cong 3 \cdot 10^8$ m/s. The transit time $t_s$ is therefore approximately equal to $t_s \cong 3 \cdot 10^{-12}$ s. At a transmission repetition rate $f_s$ of 4 MHz and a frequency difference $\Delta f$ of 40 Hz, the time dilation factor is equal to $10^5$. In order to resolve this equation for a time difference $\Delta T$ of the intermediate frequency signal ZF that corresponds to a change in filling level of half a millimeter, according to this numerical example, the time unit $\tau$ must be chosen such that a shift by $10^{-7}$ s in the maximum of the intermediate frequency signal ZF because of the reflection at the surface of the filling material, can be detected.

This can be derived by setting a correspondingly small time unit $\tau$ or, else, by improving the detection of the position of the maximum, for example by evaluation of the shape of the intermediate frequency signal ZF and/or averaging over a number of intermediate frequency signals ZF. The time unit $\tau$ can be reduced thereby, for example, to a value of $10^{-6}$ s. This corresponds to a frequency of one megahertz.

According to the invention, the same time unit $\tau$ is also used for the counting of the period duration P of the differential signal. At a differential frequency $\Delta f$ of 40 hertz, the period duration P is $25 \cdot 10^{-3}$ s. Although the time scale on which the differential signal D changes differs significantly from the time scale on which the intermediate frequency signal ZF changes, it is possible according to the invention, as described above, to use the same time unit $\tau$ for the sampling of the signals. The time unit $\tau$ is defined by the accuracy for the delay-time determination for the particular application. The accuracy of the determination of the periods duration P of the differential signal D is then to be set by the number x of periods over which the differential signal D is evaluated.

What is claimed is:

1. A level measuring device operating with microwaves comprising:

a transmission pulse generator which generates microwave transmission pulses at a transmission repetition rate, the transmission pulses being transmitted during operation by means of an antenna (7) in the direction of a filling material whose level is to be measured, the transmission pulses are reflected at a surface of the filling material causing echo signals which are received by the antenna, a reference pulse generator which generates microwave reference pulses similar to the transmission pulses generated by the transmission pulse generator, the reference pulses being generated at a reference repetition rate which is different from the transmission repetition rate by a small frequency difference, a first mixer (17) having a first input and a second input, the first input of the first mixer receiving the echo signals, the second input of the first mixer receiving the reference pulses, and the first mixer generating an intermediate frequency signal that, with respect to the echo signals, is slowed down by a time dilation factor which is equal to a quotient of the transmission repetition rate and the frequency difference, a first subcircuit (27) for sampling the intermediate frequency signal, a time interval between two successive samplings being equal to a time unit, means for generating a differential signal which changes with the frequency difference between the reference repetition rate and the transmission repetition rate, a second subcircuit (47) for determining a period duration of the differential signal on the basis of the time unit, and an evaluation unit (41)

which determines a time dilation factor in the time unit for the period duration, and determines an actual time interval between two points of the echo signal that correspond to the two sampling points, from the time dilation factor in the time unit ($\tau$), and a time interval present in the time unit between two sampling points of the intermediate frequency signal.

2. The level measuring device as claimed in claim 1, further comprising a single clock pulse generator (37) which determines the time unit.

3. The level measuring device as claimed in claim 1, wherein the means for generating the differential signal comprises a second mixer (43) having a first input and a second input, the first input of the second mixer receiving a signal which changes at the transmission repetition rate, the second input of the second mixer receiving a signal which changes at the reference repetition rate, and the second mixer generating the differential signal.

4. The level measuring device as claimed in claim 1 wherein the transmission pulse generator comprises:

an oscillator (9) having an oscillation frequency equal to the transmission repetition rate, the oscillator generating an oscillator output signal, a pulse generator (11) connected to the oscillator (9) which converts the oscillator output signal into a control signal, and a microwave source (13) controlled by the control signal which transmits the microwave transmission pulses.

5. The level measuring device as claimed in claim 1, wherein the reference pulse generator comprises:

an oscillator (19) having an oscillation frequency equal to the reference repetition rate, the oscillator generating an oscillator output signal, a pulse generator (21) connected to the oscillator (19) which converts the oscillator output signal into a control signal, and a microwave source (23) controlled by the control signal which transmits the microwave reference pulses.

6. The level measuring device as claimed in claim 1, wherein the first subcircuit (27) for sampling the intermediate frequency signal comprises a sample-and-hold circuit (29) and an analog/digital converter (31), the analog/digital converter (31) being connected to an output of the sample-and-hold circuit (29).

7. The level measuring device of claim 1, wherein the second subcircuit (47) for determining the period duration of the differential signal also samples the differential signal at sampling instants, the second subcircuit (47) comprising:

a comparator (49) which generates an output signal, the output signal being at a first signal level if the differential signal at the sampling instant exceeds a predefined threshold value and the output signal being at a second signal level if the differential signal at the sampling instant is less than the predefined threshold value, an edge detector 50 connected to the comparator (49)

which detects the beginning of a period of the differential signal, and a counter (51)

which counts the number of elapsing time units during a predefined number of periods of the differential signal.

8. The level measuring device as claimed in claim 7, further comprising means for reading out a reading from the counter after the predefined number of periods of the differential signal have elapsed and for determining the period duration of the differential frequency.

* * * * *